UNITED STATES PATENT OFFICE.

DON JUAN RAMOS, OF PORTO RICO, ASSIGNOR TO JAMES C. GALLAHER, OF PHILADELPHIA, PA., AND WM. F. TIRADO, OF PONCE, PORTO RICO.

IMPROVEMENT IN PROCESSES FOR THE MANUFACTURE OF SUGAR.

Specification forming part of Letters Patent No. 9,087, dated June 29, 1852.

*To all whom it may concern:*

Be it known that I, DON JUAN RAMOS, a native of the Island of Porto Rico, and subject of Her Majesty the Queen of Spain, (assignor to James C. Gallaher, a native of the city of Philadelphia, State of Pennsylvania, and Consul of the United States of America at the port of Ponce, Island of Porto Rico, and William F. Tirado, a native of the town and merchant of the port of Ponce, in the Island of Porto Rico,) have invented and discovered certain new and useful Improvements in the Process of Manufacturing Muscovado or Raw Sugar from the Sugar-Cane, by which the quality is improved and the quantity obtained from any given amount of canes augmented; and I do hereby declare the following to be a full, clear, and exact description thereof, namely:

To any number of sugar-pans as ordinarily mounted for boiling the juice of the sugar-cane I attach transverse canals with lids connecting with a longitudinal canal which extends the entire length of the battery. The object of these transverse canals is, when their lids are raised, to receive the froth of the boiling liquor, and in connection with the said longitudinal canal, and with the use of movable gates, to return it directly and tranquilly to either of the receiving-pans, in place of brushing it back from pan to pan, as is the ordinary mode. The skimmings or feculencies from the receiving-pans are taken off by a rake or scraper, and are thrown by it into and are carried off by a separate canal which is placed lower down and in a line with the longitudinal canal above mentioned. The use of the rake or scraper, in combination with the rest of my process, obviates the necessity of a skimmer at the receiving-pans, and saves the labor of one hand at the battery. This lower canal is supplied with a lid against each receiving-pan, which is thrown down toward the canal when it is desired to scrape off the skimmings or feculencies. Each lid is supported in an upright position by movable blocks. Each and every lid in the battery is provided with linen or other cloth at the joints to prevent the passage of the liquor through them. When the sirup is ready to strike I throw it into a wooden box mounted at the end of the battery. This box has a hole in the bottom which is stopped with a plug. After the strike is thrown into it the plug is taken out and the sirup allowed to pass off by a canal into the cooler. In order to prevent the passage of the froth which sometimes forms on the surface into the cooler, a small rake or scraper is used to hold it back. After the sirup has run off into the cooler the froth is gathered up and thrown back into the receiving-pan. Under each cooler I build a close wall in order to retain some heat under the cooler, leaving only a space open on one side through which to introduce under the cooler a small canal by which the molasses is drawn off. Each cooler has a hole in the bottom stopped by a plug. In the middle of each cooler is placed lengthwise a movable plank, set edgewise and fastened at each end with hooks, the lower part of each end of the plank being cut so as to allow the liquor or sirup to circulate around it. After the strike has remained to crystallize in the cooler for forty-eight hours the movable plank is taken out and the molasses is allowed to flow into the vacancy thus made. In half an hour or an hour the plug is taken out and the molasses allowed to pass out by the small canal below into a vessel placed to receive it. After the molasses has thus run out the sugar is then taken out of the cooler and placed, as in the ordinary way, in hogsheads or barrels for market. The molasses drawn off, as above stated, is placed in a double cooler; or, in other words, a cooler of the above description divided into two compartments, each compartment being provided with its movable plank, hole, and plug. This cooler is only filled so much as to allow room for one fresh strike of sirup from the battery to be thrown upon it. This mixture is then allowed to remain another forty-eight hours to crystallize, when the movable planks are taken out and the molasses drawn off by small canals, as before described. This molasses is then placed in the deposit or tank for molasses, and the sugar made by this operation is placed in separate casks.

In cleaning or defecating the liquor in the receiving-pans I use an ingredient now for the first time applied to this use, being a composition of the juice of the plantain-stalk and of quicklime in certain proportions and in quantities suitable to the different varieties of the cane-juice. Of a mixture consisting of ten gallons of plantain-juice and seven pounds of quicklime about half a pint is generally used for defecating three hundred gallons of cane-juice, and it is added to the liquor in the receiving-pan at that stage of the process in which lime is usually added in the ordinary mode of boiling. Some varieties of the cane-juice will require a combination of the plantain-juice and of quicklime in different proportions, which must be ascertained by trial. When beginning to grind the sugar-pans are filled with water, and fire is placed under the battery as soon as a sufficient quantity of juice is expressed from the cane to fill the first receiving-pan. The fire is applied as early as possible to prevent acidity. During intervals of the process washing down must be resorted to as frequently as possible, as cleanliness is of the first importance. Any particular part of the process of manufacturing sugar which I have not expressly named is understood to be carrid on in the ordinary mode.

What I claim as my own invention and discovery, and desire to secure by Letters Patent, is—

1. The use of the juice of the plantain-stalk and quicklime combined, substantially in the manner and for the purpose described, for defecating the cane-juice.

2. The application of a fresh strike of concentrated sirup from the battery to the molasses first drained off, for the purpose of crystallizing the sugar yet remaining in the molasses.

In testimony whereof I have hereunto signed my name, before two subscribing witnesses, at Ponce, Porto Rico, the 6th day of May, 1852.

JUAN RAMOS.

Witnesses:
  G. LOHRE,
  RAM CORTADA.